US008244424B2

(12) United States Patent
Subelet et al.

(10) Patent No.: US 8,244,424 B2
(45) Date of Patent: Aug. 14, 2012

(54) DATABASE COMPRISING TOPOGRAPHICAL INFORMATION ON OBSTACLES AND METHOD FOR GENERATING ONE SUCH DATABASE

(75) Inventors: Michel Subelet, Cugnaux (FR); Sylvain Fontaine, Villeneuve Tolosane (FR)

(73) Assignee: Thales (FR)

( * ) Notice: Subject to any disclaimer, the term of this patent is extended or adjusted under 35 U.S.C. 154(b) by 926 days.

(21) Appl. No.: 12/093,119

(22) PCT Filed: Nov. 6, 2006

(86) PCT No.: PCT/EP2006/068119
§ 371 (c)(1),
(2), (4) Date: Sep. 4, 2008

(87) PCT Pub. No.: WO2007/054477
PCT Pub. Date: May 18, 2007

(65) Prior Publication Data
US 2009/0182764 A1 Jul. 16, 2009

(30) Foreign Application Priority Data
Nov. 10, 2005 (FR) ..................................... 05 11548

(51) Int. Cl.
*G01C 21/00* (2006.01)

(52) U.S. Cl. ......... 701/24; 701/1; 701/3; 701/4; 701/13; 701/14; 340/953; 340/436; 340/901; 340/945; 340/946; 342/33; 342/61; 342/65; 342/118; 342/120; 455/422.1; 244/158.1; 250/330

(58) Field of Classification Search .................. 701/1, 3, 701/4, 7, 8, 9, 10, 13, 14, 16, 25, 33, 36, 701/38, 48, 93, 117, 200, 207, 208, 213, 701/300, 301; 340/436, 901, 945, 946, 953, 340/961, 963, 969, 970; 342/26 B, 33, 61, 342/65, 118, 120, 175, 195, 357.31; 455/422.1; 14/2.5; 244/158.1; 250/330
See application file for complete search history.

(56) References Cited

U.S. PATENT DOCUMENTS
5,364,047 A * 11/1994 Petit et al. ................. 246/122 R
(Continued)

OTHER PUBLICATIONS

Dubet S Ed—Institute of Electrical and Electonics Engineers: "Terrain, Obstacle and Airport Databases for Electronic Flight Bags" Oct. 12, 2003, 22nd. DASC. The 22nd. Digital Avionics Systems Conference Proceedings. Indianapolis, IN, Oct. 12-16, 2003; Digital Avionics Systems Conference, New York, NY: IEEE, US, pp. 13D21-13D211, XP010669025; IBN: 07-7803-7844-X; pp. 13.D. 2-2.

Schiefele J et al: "Safety Relevant Navigation and Certfiable Databases for 3D Synthetic Vision Systems"; Oct. 31, 1998, Digital Avionics Systems Conference, 1998. Proceedings., 17th DASC. The AIAA/IEEE/SAE; Bellevue, WA, USA Oct. 31-Nov. 7, 1998, New York, NY, USA, IEEE, US, p. J21-1, XP010318185; ISBN: 0-7803-5086-3; pp. J21-J23.

(Continued)

*Primary Examiner* — James Trammell
*Assistant Examiner* — McDieunel Marc
(74) *Attorney, Agent, or Firm* — Lowe Hauptman Ham & Berner, LLP

(57) ABSTRACT

The invention relates to a database and a method of generating a database containing topographical information on obstacles distributed over a geographic area subdivided into cells. The method includes reading topographical data obtained from heterogeneous sources. Topographical data are generated which relate to pointlike obstacles from the information collected from the topographical data. Topographical data are generated which relate to linear obstacles from the information collected from the topographical data. The obstacle database is created. Each cell contains a link to the obstacles whose coordinates in the geographic area covered by the cell are recorded with an uncertainty value. In particular, the invention applies to the generation of a database on board an aircraft.

13 Claims, 4 Drawing Sheets

U.S. PATENT DOCUMENTS

| | | | | |
|---|---|---|---|---|
| 6,583,733 B2 * | 6/2003 | Ishihara et al. | ............... | 340/946 |
| 6,737,987 B2 * | 5/2004 | Conner et al. | ................ | 340/946 |
| 6,833,797 B2 * | 12/2004 | Ishihara | ........................ | 340/946 |
| 6,906,641 B2 * | 6/2005 | Ishihara | ........................ | 340/946 |
| 7,826,971 B2 * | 11/2010 | Fontaine et al. | .............. | 701/301 |
| 7,881,866 B2 * | 2/2011 | Meunier et al. | ............... | 701/301 |
| 2001/0035831 A1 * | 11/2001 | Block | .......................... | 340/970 |
| 2002/0036574 A1 * | 3/2002 | Ishihara | ........................ | 340/945 |
| 2002/0143729 A1 * | 10/2002 | Fostick | ............................. | 707/1 |

OTHER PUBLICATIONS

Friedrich A et al: "Airport Databases for 3D Synthetic-Vision Flight-Guidance Displays: Database Design, Quality Assessment, and Data Generation"; Apr. 1999; Proceedings of the SPIE—The International Society for Optical Engineering SPIE—Int. Soc. Opt. Eng. USA, vol. 3691, pp. 108-115, XP002406244; ISSN: 0277-786X.

* cited by examiner

DATABASE COMPRISING TOPOGRAPHICAL INFORMATION ON OBSTACLES AND METHOD FOR GENERATING ONE SUCH DATABASE

CROSS REFERENCE TO RELATED APPLICATIONS

The present Application is based on International Application No. PCT/EP2006/068119, filed on Nov. 6, 2006, which in turn corresponds to French Application No. 05 11458 filed on Nov. 10, 2005, and priority is hereby claimed under 35 USC §119 based on these applications. Each of these applications are hereby incorporated by reference in their entirety into the present application.

FIELD OF THE INVENTION

The invention relates to a method of generating a database. In particular, the invention applies to the generation of a database on board an aircraft and notably containing topographical information on obstacles. The invention also relates to an obstacle database, that can notably be on board an aircraft.

BACKGROUND OF THE INVENTION

Among the risks that an aircraft has to be able to deal with, there is a category of accidents designated by the expression controlled flight into terrain (CFIT). This category includes accidents during which an aircraft that is navigable under the control of its crew unintentionally strikes the relief, obstacles or a body of water without the crew being aware of the imminence of the collision.

To limit the risks associated with controlled flights into terrain, new monitoring instruments have been developed. Notable among these are the terrain awareness and warning system (TAWS). This system notably comprises a topographical database on the relief of the terrains. This type of system is totally effective only if the database notably contains topographical data that is consistent, accurate and exhaustive. The topographical relief data that feeds the systems of the terrain awareness and warning system type fully satisfies all these conditions.

However, quite the opposite applies when it comes to topographical data concerning obstacles (for example, man-made obstacles of electricity line type or even of very high construction type). In practice, the creation of a topographical database containing data on the obstacles with a level of accuracy that is acceptable for an aeronautical application requires accurate data to be collected for a large number of different obstacles distributed over geographic areas covering all of the earth's surface. Furthermore, how to collect and organize such information has not been defined by an independent organization.

Information on the obstacles can be obtained from various sources. However, collecting such heterogeneous and scattered data is a particularly difficult task. Furthermore, the accuracy and the quality of this data is difficult to guarantee and can vary considerably from one source to another.

There are also accessible and marketed databases containing topographical data for the obstacles. However, the accuracy of the data also varies considerably from one database to another. Furthermore, the way the data is structured is not necessarily optimized for the size, performance and reliability constraints imposed for an onboard aeronautical application.

This is why the topographical data concerning obstacles is not taken into account in the terrain awareness and warning systems, although its use can very significantly improve ground surveillance.

SUMMARY OF THE INVENTION

One notable aim of the invention is to overcome the above-mentioned drawbacks. To this end, the subject of the invention is a method of generating a database comprising topographical information on obstacles, the obstacles being distributed over a geographic area. The geographic area is subdivided in the database into several geographic region levels comprising cells. The method according to the invention comprises the following steps:
(a) Reading topographical data obtained from heterogeneous data sources;
(b) Generating topographical data relating to pointlike obstacles from the information collected in the step (a);
(c) Generating topographical data relating to linear obstacles from the information collected in the step (a);
(d) Creating the obstacle database (1).

Each cell contains a link to the obstacles. Each coordinate of said obstacles in the geographic area covered by said cell is recorded with an uncertainty value.

In one embodiment, if the uncertainty value of the coordinates of an obstacle is not known, the uncertainty value is set to a default value.

In another embodiment, when generating the topographical data relating to pointlike obstacles for each cell, a link is created for each pointlike obstacle satisfying one of the following conditions:
the center of said pointlike obstacle belongs to said cell;
the area of uncertainty of said obstacle is at least partially contained in said cell.

Advantageously, each end of a linear obstacle is represented by a pointlike obstacle. When generating the topographical data relating to linear obstacles for each cell, a link can then be created for each linear obstacle satisfying one of the following conditions:
one of the ends of said linear obstacle at least partially belongs to said cell, the areas of uncertainty of the ends being included;
one of the segments defined by the ends of said linear obstacle intersects said cell;
if the area of uncertainty of said linear obstacle is included at least partially in said cell.

In another embodiment, the method according to the invention comprises a step for generating an access tree to the obstacles, the tree comprising:
a main node of level 0 from which the tree can be browsed through,
nodes pointing to a geographic area, the level of each node corresponding to the level of the geographic area toward which it points.

Each node contains a link to all the lower-level nodes included in the same geographic region and contains at least one obstacle. Each node corresponding to a cell comprises, for example:
information on the number of pointlike obstacles present in the corresponding cell;
information on the number of linear obstacles present in the corresponding cell;
pointers to the tables containing information on the obstacles present in the corresponding cell.

Furthermore, the method according to the invention can include a step for generating description tables of the obstacle database, the description tables containing information relating to the database.

Another subject of the invention is a database containing topographical information on obstacles, the obstacles being distributed over a geographic area. The geographic area is subdivided into a number of geographic region levels comprising cells. The database comprises:

- at least one Cells table containing a line for each cell of the geographic area;
- at least one Individual obstacles table containing a line for each pointlike obstacle of the geographic area, said table comprising fields for specifying the coordinates and the height of the pointlike obstacles;
- at least one Linear obstacles table containing a line for each linear obstacle of the geographic area, said table comprising fields for specifying the coordinates and the height of the ends of the linear obstacles, each line of the Linear obstacles table comprising links to at least two lines of the Pointlike obstacles table.

Each line of the Cells table comprises links to the obstacles present in the corresponding cell.

In an embodiment, the database contains a Descriptor table of the obstacle database for storing information for identifying the obstacle database loaded on board the aircraft, the date when the obstacle database was produced, and the elements needed to find and access the elements included in the other tables. The Descriptor table of the obstacle database comprises, for example, the following fields: serial number, production date, pointers to the tables containing data on the obstacles.

Advantageously, the database according to the invention comprises tables describing a tree for accessing the information on all the obstacles.

Advantageously, the obstacle database is incorporated in a terrain awareness and warning system comprising an obstacle collision predicting and alerting system.

Notable advantages of the invention are that it can be implemented on existing terrain awareness and warning systems. The invention also makes it possible to improve the safety of air transport by reducing the risks of controlled flights into terrain.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWING

The present invention is illustrated by way of example, and not by limitation, in the figures of the accompanying drawings, wherein elements having the same reference numeral designations represent like elements throughout and wherein.

DETAILED DESCRIPTION OF THE INVENTION

Figure 1:
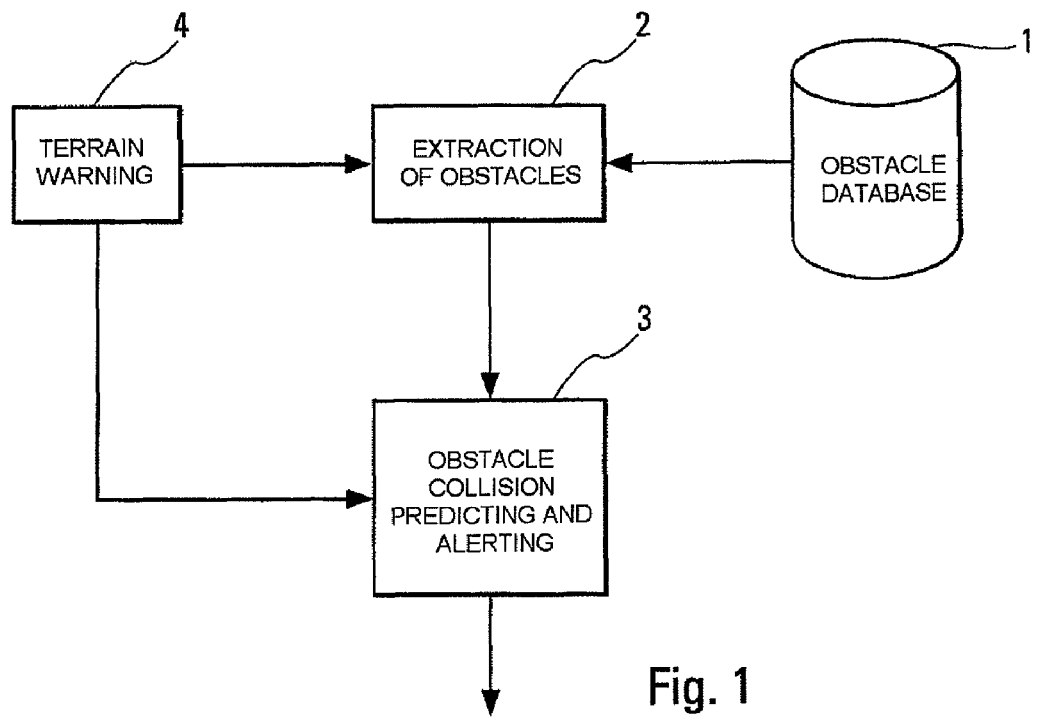
FIG. 1, an obstacle collision predicting and alerting system using the data in an obstacle database according to the invention generated using a method according to the invention.

FIG. 1 illustrates an obstacle collision predicting and alerting system using the data from an obstacle database according to the invention generated using a method according to the invention.

A terrain awareness and warning system is an instrument that can be installed on board an aircraft. It notably comprises an onboard topographical database on the relief of the terrains. One notable object of the method of generating a database notably comprising topographical information on obstacles according to the invention is to generate a topographical obstacle database. The topographical obstacle database can notably complement the existing data contained in the topographical terrain relief database. The topographical obstacle database can, for example, be used in a terrain awareness and warning system complemented by an obstacle collision predicting and alerting function.

In FIG. 1, a terrain warning device 4 sends a set of parameters to an obstacle extraction device 2. The terrain warning device 4 can, for example, be included in a terrain awareness and warning system. The terrain warning device 4 sends, for example, a clearance sensor and a cartographic data extraction area. The clearance sensor represents the altitude of the aircraft predicted over a short period (normally less than a minute). The clearance sensor notably comprises a table associating the predicted altitude of the aircraft with each distance sample relative to the aircraft. The clearance sensor is computed at a frequency dependent on the flight parameters of the aircraft, such as the speed, the altitude or even the rate of climb of the aircraft. The cartographic data extraction area is linked to the clearance sensor. In practice, the geographic extraction area corresponds to the region concerned in the horizontal plane where the aircraft is likely to be in the short term. The parameters sent by the warning device 4 are used notably by the obstacle extraction device 2 to extract from an obstacle database 1 the topographical data on obstacles present in the extraction area according to the flight parameters of the aircraft. The obstacle database 1 according to the invention has, for example, previously been generated using the method of generating an obstacle database according to the invention. The obstacle collision predicting and alerting device 3 receives the data extracted from the obstacle database 1 and data transmitted by the terrain warning device 4. The obstacle collision predicting and alerting device 3 notably computes the potential collisions of the aircraft with one or more obstacles according to the flight parameters of the aircraft and, where appropriate, triggers warnings.

Figure 2:
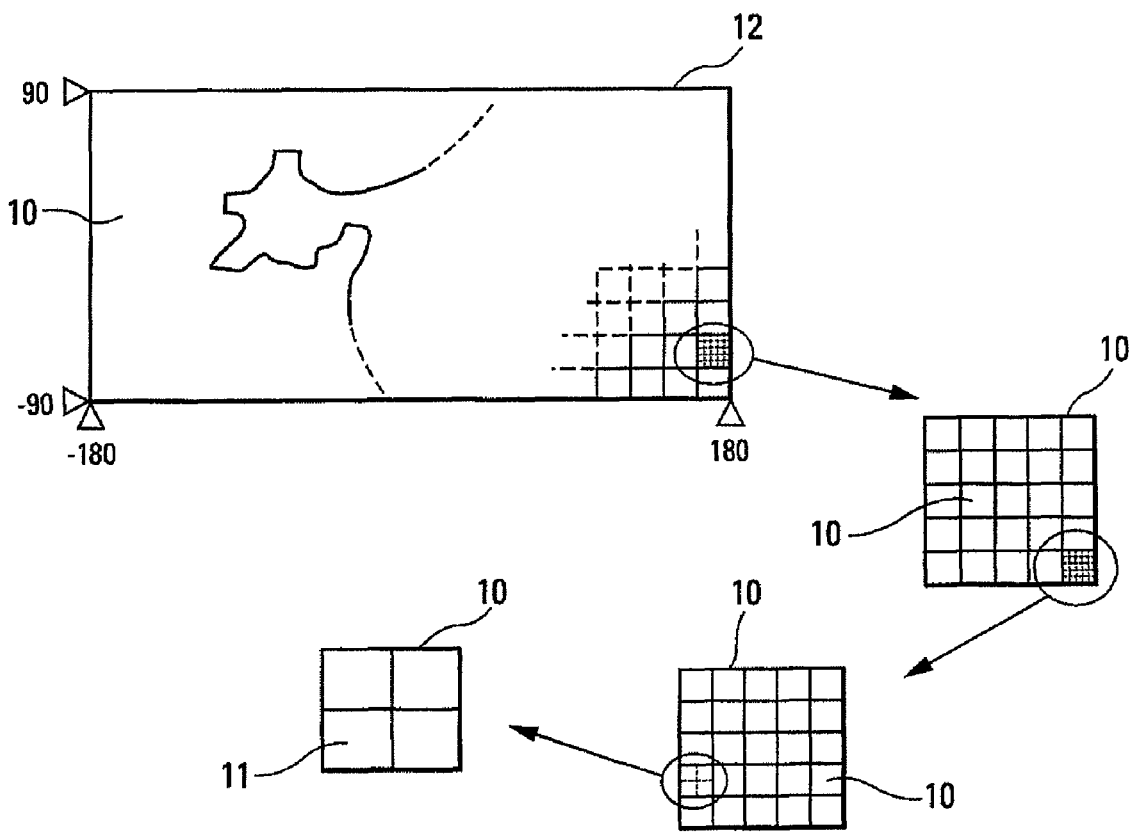
FIG. 2, a tree structure with which to break down a region into individual areas so that it can be set up in an existing terrain database.

FIG. 2 shows a tree structure with which to break down a region into individual areas so that it can be set up in an existing terrain database. The obstacle database according to the invention can notably be associated with a terrain database as described hereinbelow.

The cartographic data included in a terrain database corresponds to at least one geographic region 10. This geographic region 10 can, for example, extend from a longitude of −180° to 180° and from a latitude of −90° to 90°. This geographic region 10 is thus designated level 1 geographic region 10.

The level 1 geographic region 10 is subdivided into level 2 geographic regions 10. The level 1 geographic region 10 can, for example, include 72 level 2 regions in the longitude direction and 36 level 2 geographic regions 10 in the latitude direction. A level 2 geographic region can, for example, represent a geographic region extending over 1° in longitude and over 1° in latitude. A level 2 geographic region 10 therefore represents a fraction of the level 1 geographic region 10.

The level 2 geographic regions 10 can be further subdivided into level 3 geographic regions 10. Each level 2 geographic region 10 can, for example, include five level 3 regions in the longitude direction and five level 3 geographic regions 10 in the latitude direction. A level 3 geographic region can, for example, represent a geographic region extending over 12 seconds in longitude and over 12 seconds in latitude. A level 3 geographic region 10 therefore represents a fraction of the level 2 geographic region 10.

The level 3 geographic regions 10 can be further subdivided into level 4 geographic regions 10. Each level 3 geographic region 10 can, for example, include two level 4 regions in the longitude direction and two level 4 geographic regions 10 in the latitude direction. A level 4 geographic region can, for example, represent a geographic region extending over 6 seconds in longitude and over 6 seconds in latitude. A level 4 geographic region 10 therefore represents a fraction of the level 3 geographic region 10.

A cell 11 is an individual geographic region 10, that is, a geographic region of the highest possible level described in the database, corresponding to the smallest subdivision in terms of surface area. In the example of FIG. 2, a level 4 geographic region 10 is a cell 11. A cell 11 therefore represents a basic and indivisible fraction of the level 3 geographic region 10.

Figure 3:
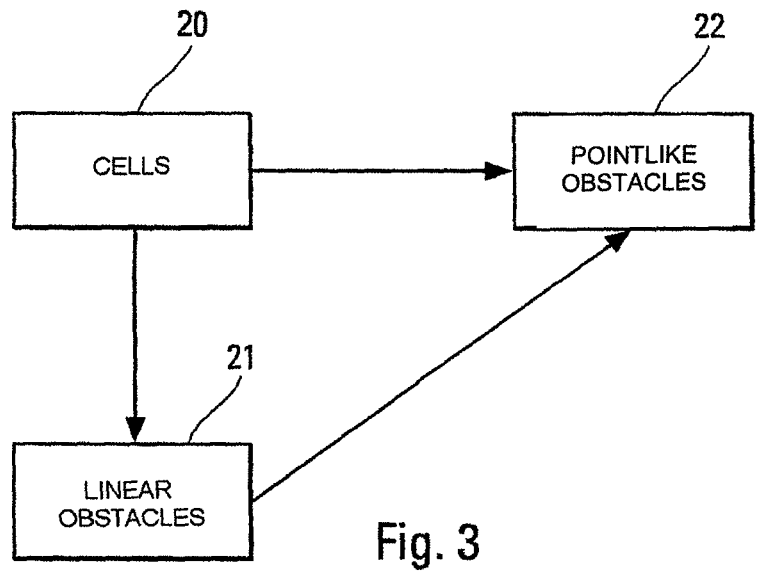
FIG. 3, a representation of topographical data included in the obstacle database according to the invention.

FIG. 3 shows a representation of topographical data included in the obstacle database according to the invention. Elements that are identical to the elements already presented bear the same references. The obstacle database according to the invention can notably be associated with an existing terrain database.

An obstacle can be a so-called pointlike obstacle if it is restricted to a limited geographic area. A pointlike obstacle can be described notably by its latitude, its longitude and its height, for example an above-mean-sea-level height. To this can be added the precision of each of its coordinates and, where appropriate, its horizontal extension. Of course, the parameters for characterizing an obstacle depend on the data available for each of the obstacles.

An obstacle can also be a so-called linear obstacle if it extends over a large geographic area. The ends of a linear obstacle can be represented by pointlike obstacles: the methods of calculating collisions with an obstacle then interpret these pointlike obstacles as the ends of a linear obstacle delimited by these pointlike obstacles. A linear obstacle can therefore be represented by a list of pointlike obstacles.

The obstacle database according to the invention also includes a table named Cells 20. Thus, each cell 11 included in at least one level 1 geographic region 10 has associated with it a line in the Cells table 20. The obstacle database according to the invention also includes a table named Pointlike obstacles 22. The Pointlike obstacles table 22 includes a line for each pointlike obstacle inserted into the obstacle database according to the invention. The Pointlike obstacles table 22 can, for example, include the following attributes: latitude, longitude, height, horizontal precision. The obstacle database according to the invention notably includes a table named Linear obstacles 21. The Linear obstacles table 23 includes a line for each linear obstacle inserted into the obstacle database according to the invention.

Each line of the Cells table 20 also includes links to the obstacles present in the corresponding cell 11. Thus, each line of the Cells table 20 contains an array comprising pointers to lines of the Pointlike obstacles table 22 and/or the Linear obstacles table 21. The data contained in a line of the Cells table 20 therefore makes it possible to access the data on all the pointlike or linear obstacles present in the corresponding cell 11.

Each line of the Linear obstacles table 21 notably comprises links to at least two lines of the Pointlike obstacles table 22, each linear obstacle being able to be represented by a list of pointlike obstacles.

The tables represented in FIG. 3 are given by way of indication. The obstacle database according to the invention can also include other tables. Similarly, the tables presented can be grouped together or divided up according to the requirements relating to implementation or even integration in another database.

In one embodiment, the obstacle database according to the invention includes a table named Descriptor of the obstacle database. This table can also be used to store information that can be used to identify the obstacle database loaded on board the aircraft, the date when the obstacle database was produced, and the elements needed to find and access the elements contained in the other tables of the obstacle database. Thus, the obstacle database Descriptor table can, for example, include the following attributes: a serial number, a date of production, pointers to the tables containing the data on the obstacles.

In one embodiment, the obstacle database comprises tables describing a tree structure with which to access the information on all the obstacles. This tree structure makes it possible notably to access, effectively in terms of performance, the list of obstacles in a given geographic area.

Figure 4:
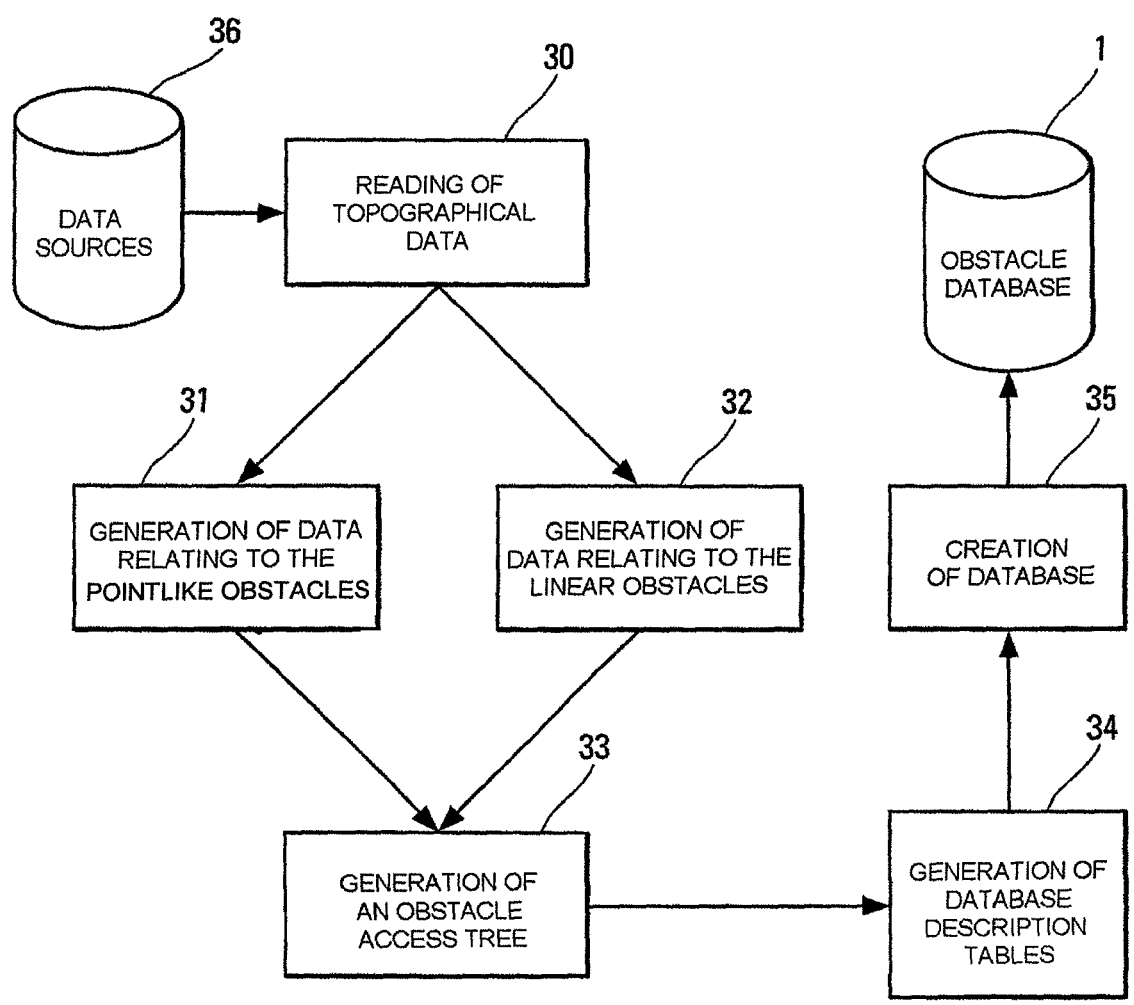
FIG. 4, the method of generating a database on board an aircraft and notably containing topographical information on obstacles according to the invention.

FIG. 4 shows the method of generating a database on board an aircraft and notably comprising topographical information on obstacles according to the invention. Elements that are identical to the elements already presented bear the same references.

In a first step, topographical data is extracted 30 from various data sources 36. Notable among these data sources 36 are commercial databases containing topographical data on obstacles or even information originating from various organizations responsible for itemizing the obstacles. This step is for accessing topographical data that exists in various forms regardless of the format used to represent it. Furthermore, the various data sources 36 can contain different data in terms of its comprehensiveness or precision. The data sources 36 are not necessarily designed and optimized to be on board an aircraft. The data sources 36 are not necessarily databases.

The data extracted from the data sources 36 in the step 30 is then transferred to a step for generating data relating to the pointlike obstacles 31. The step 31 can, for example, convert the data extracted in the step 30 into a format that is compatible with the database according to the invention described in FIG. 3. Depending on the data available, for each pointlike obstacle, the data extracted in the step 30 relating to the latitude, longitude, height, precision of each of the coordinates and horizontal extension are recorded in the tables of the database. Of course, the parameters used to characterize an obstacle depend on the data available for each of the obstacles. When the obstacle database 1 is used jointly with a terrain database, it is desirable:

- to use, in the step 31, all the pointlike obstacles included in the available data sources 36, even if the precision of each of the coordinates is not given.
- to record, in the step 31, for a given pointlike obstacle, the horizontal and/or vertical precision with a default value if this information is unknown, the default value corresponding, for example, to the highest known uncertainty value.

The data relating to the pointlike obstacles generated in the step 31 is linked to at least one cell 11 by a method of assigning pointlike obstacles to the cells. To create this link, it is, for example, possible to enter a pointer into the Cells table 20 of a database according to the invention for each pointlike obstacle.

The data extracted from the data sources 36 in the step 30 is then transferred to a step for generating data relating to the linear obstacles 32. The step 32 can, for example, convert the data extracted in the step 30 into a format compatible with the database according to the invention described in FIG. 3. Depending on the data available, for each linear obstacle, the data extracted in the step 30 relating to the latitude, longitude, height, precision of each of the coordinates and horizontal extension is recorded in the tables of the database. For each linear obstacle, bearing in mind that a linear obstacle can be represented by a set of pointlike obstacles, pointlike obstacles are created in the obstacle database and are linked to the corresponding linear obstacle. Of course, the parameters used to characterize an obstacle depend on the data available for each of the obstacles. When the obstacle database 1 is used jointly with a terrain database, and to optimize processing performance, it is desirable:

- to assign the height field of a linear obstacle the maximum value of the height field of the pointlike obstacles that correspond to the linear obstacle, in the step 32;
- to use, in the step 32, all the linear obstacles contained in the available data sources 36, even if the precision of each of the coordinates is not given;
- to record, in the step 32, for a given linear obstacle, the horizontal and/or vertical precision with the most pessimistic known value if such information is unknown.

The data relating to the linear obstacles generated in the step 32 is linked to at least one cell by a method of assigning pointlike obstacles to a cell. To create this link, it is, for example, possible to enter a pointer in the Cells table 20 of a database according to the invention for each linear obstacle.

In an embodiment that can also facilitate access to the obstacles and optimize performance levels, a tree structure for accessing the obstacles is generated and inserted into the obstacle database in a step 33. The tree structure comprises a main node of level 0 from which the tree can be browsed. The tree can comprise:

- level 1 nodes, each level 1 node pointing to a level 1 geographic area;
- level 2 nodes, each level 2 node pointing to a level 2 geographic area;
- level 3 nodes, each level 3 node pointing to a level 3 geographic area;
- level 4 nodes, each level 4 node pointing to a cell 11.

Each node can contain additional information. In particular, a level 4 node can contain information on the number of pointlike obstacles present in the corresponding cell 11, information on the number of linear obstacles present in the corresponding cell 11, pointers to the tables containing information on the obstacles present in the corresponding cell 11.

Also, the level 0 main node contains links to the level 1 nodes containing obstacles. Also, if a level 1 geographic region does not contain any obstacles (for example, over the sea), the level 0 main node contains no link to the level 1 node corresponding to the obstacle-free geographic area. Similarly, each level 1 node contains links to the level 2 nodes that contain obstacles. Similarly, each level 2 node contains links to the level 3 nodes that contain obstacles. Similarly, each level 3 node contains links to the level 4 nodes that contain obstacles. Also, a node is linked to a lower-level node only if the region corresponding to the lower-level node contains obstacles. The creation of this tree makes it possible notably to access effectively in terms of performance the list of obstacles in a given geographic area. It is also possible, to improve performance levels, to sort the nodes in ascending order according to the longitude of the geographic area corresponding to each node, then according to latitude.

The step 34 for generating the description tables of the obstacle database 1 makes it possible to collect information relating to the database and enter it into the obstacle database. This information can, for example, be recorded in the table named Descriptor of the obstacle database 1. Notable among this information is an identifier of the obstacle database 1 loaded on board the aircraft, the date on which the obstacle database 1 was produced. It is also possible to record parameters with which to reference an access tree if the latter has been generated, and pointers to the other tables containing data on the obstacles in the obstacle database 1.

In a step 35, the obstacle database 1 is created and loaded on board the aircraft that includes, for example, a terrain awareness and warning system complemented by an obstacle collision predicting and alerting system. The integrity and consistency of the obstacle database 1 can then be checked. The obstacle database can also be incorporated in a terrain database present on board the aircraft.

Figure 5A:
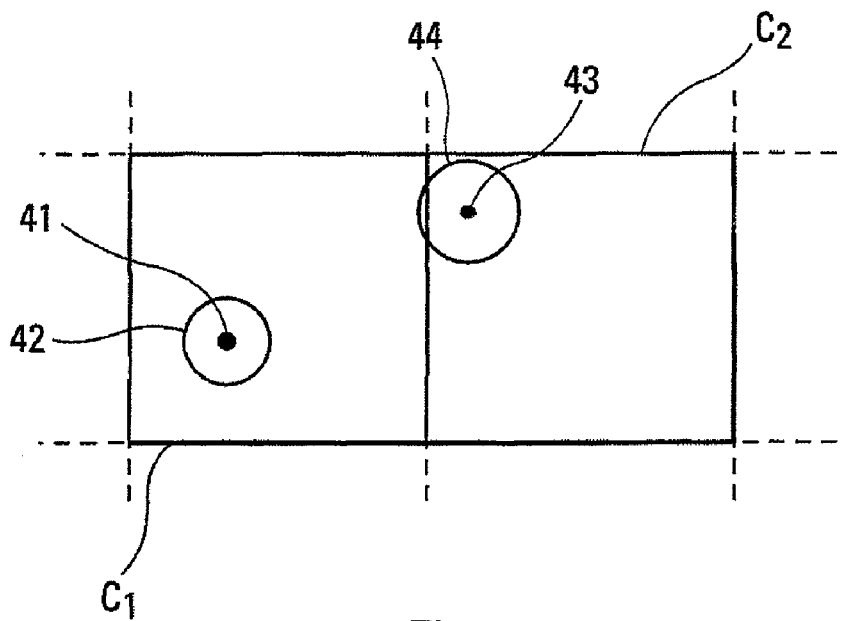
FIG. 5a, an example of positioning of two pointlike obstacles in relation to two cells.

FIG. 5a shows the positioning of two pointlike obstacles in relation to two cells. Elements identical to the elements already presented bear the same references.

FIG. 5a represents two cells 11: a cell $C_1$ and a cell $C_2$. A pointlike obstacle 41 is present in the cell C1. An area of uncertainty 42 corresponds to a disk centered on the pointlike obstacle 41 with a radius equal to the value of the uncertainty concerning the longitude and latitude coordinates of the pointlike obstacle 41. The area of uncertainty 42 is fully included in the cell C1. A pointlike obstacle 43 is present in the cell C2. An area of uncertainty 42 corresponds to a disk centered on the pointlike obstacle 43 with a radius equal to the value of the uncertainty concerning the longitude and latitude coordinates of the pointlike obstacle 43. The area of uncertainty 42 is partly included in the cell C2 and in the cell C1.

Figure 5B:
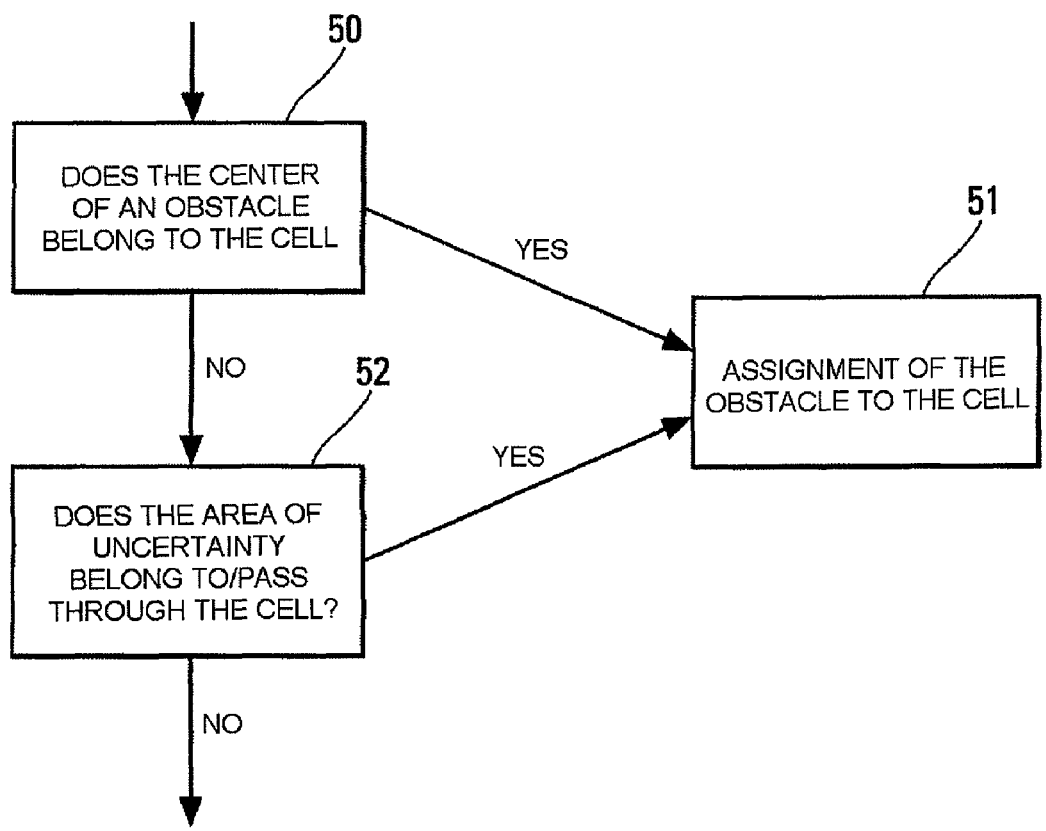
FIG. 5b, a method of assigning a pointlike obstacle to the cells according to the invention.

FIG. 5b illustrates a method of assigning a pointlike obstacle to the cells according to the invention. Elements identical to the elements already presented bear the same references.

This method can notably be used in the step 31 for generating the database of pointlike obstacles to determine the cells with which an obstacle must be linked. For each cell 11 present in the obstacle database 1, and for a given pointlike obstacle, the following steps are performed:

- In a step 50, a check is carried out to see if the center of the pointlike obstacle, that is, its longitude and its latitude, belongs to the cell. If it does, in a step 51 the obstacle is assigned to the cell by creating a link between the cell 11 and the pointlike obstacle.
- In a step 51, if the center of the pointlike obstacle does not belong to the cell, a check is carried out to see if the area of uncertainty is at least partly included in the cell. If it is, in a step 51 the obstacle is assigned to the cell by creating a link between the cell 11 and the pointlike obstacle.

Otherwise, no link is created between the cell 11 and the pointlike obstacle.

This iteration is then repeated for all the pointlike obstacles. Thus, a pointlike obstacle can be assigned to several cells if the area of uncertainty of a pointlike obstacle belongs to several cells. In order to optimize the method, it is best to perform the step 50 before the step 51 in order to optimize the computation time. However, the sequencing of the steps is given only as an indication.

To return to the example of FIG. 5*a*, by applying the method described in FIG. 5*b*, the pointlike obstacle 41 is assigned to the cell C1, the pointlike obstacle 43 is assigned to the cell C1 and to the cell C2.

Figure 6A:
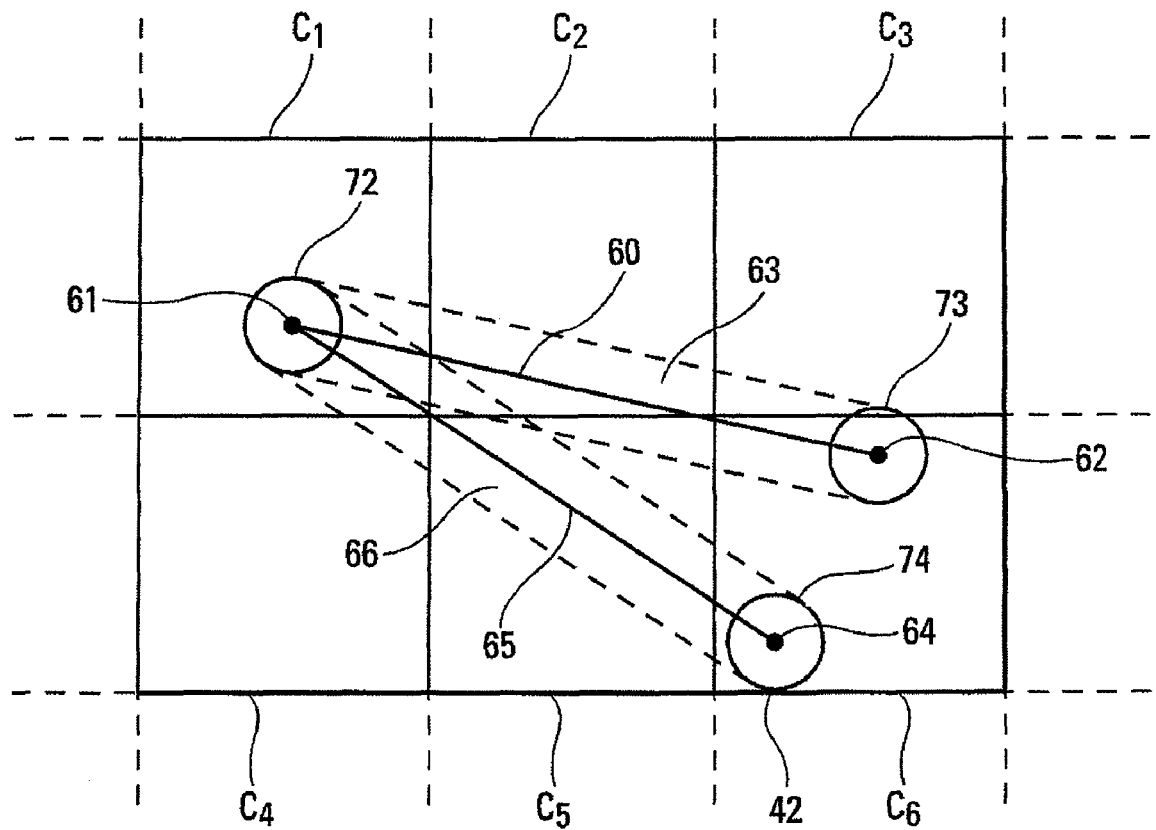
FIG. 6a, an example of positioning of two linear obstacles in relation to six cells.

FIG. 6*a* shows the positioning of two linear obstacles in relation to six cells. Elements identical to the elements already presented bear the same references.

FIG. 6*a* represents six cells 11: a cell $C_1$, a cell $C_2$, a cell C3, a cell C4, a cell C5 and a cell C6. A linear obstacle 60 is represented by a pointlike obstacle 61 present in the cell C1 with an area of uncertainty 72 and a pointlike obstacle 62 present in the cell C3 with an area of uncertainty 73. An area of uncertainty 63 of the linear obstacle 60 corresponds to the area included between the pointlike obstacles 61 and 62 taking into account the uncertainty concerning the longitude and latitude coordinates of the pointlike obstacles 61 and 62. A linear obstacle 65 is represented by the pointlike obstacle 61 and a pointlike obstacle 64 present in the cell C3 with an area of uncertainty 74. An area of uncertainty 66 of the linear obstacle 65 corresponds to the area included between the pointlike obstacles 61 and 64 taking into account the uncertainty concerning the longitude and latitude coordinates of the pointlike obstacles 61 and 64.

Figure 6B:
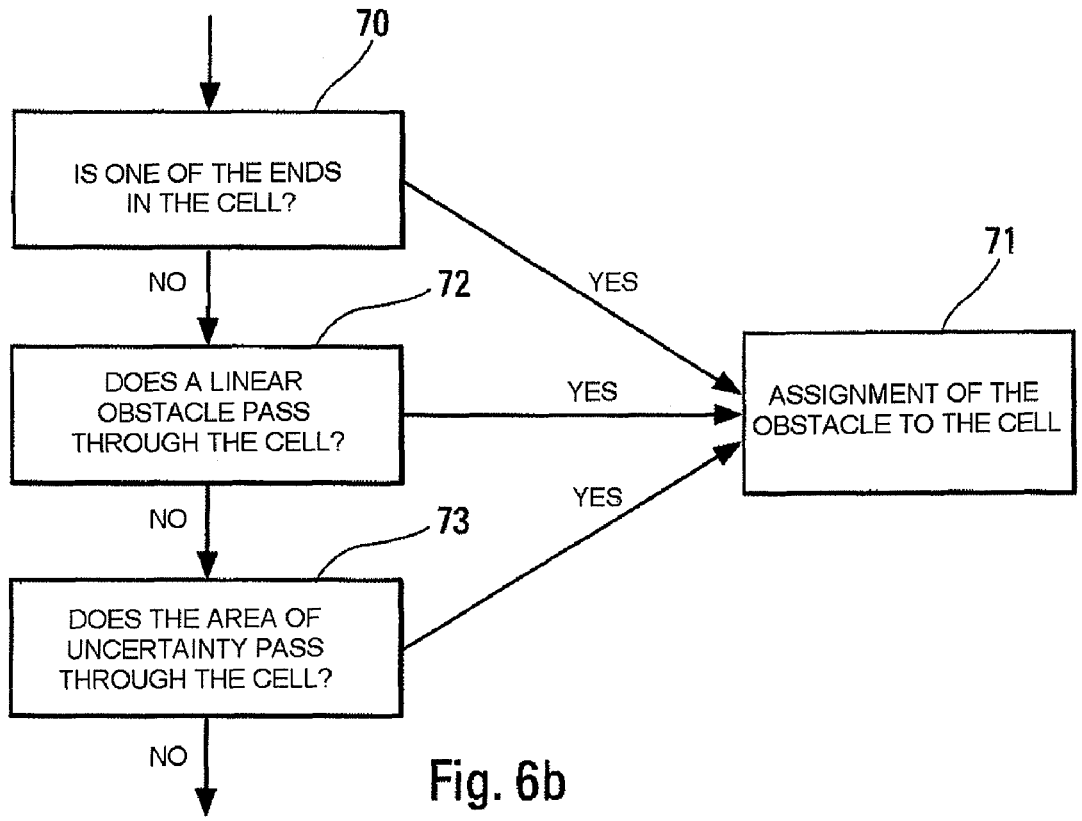
FIG. 6b, a method of assigning a linear obstacle to the cells according to the invention.

FIG. 6*b* illustrates a method of assigning a linear obstacle to the cells according to the invention. Elements identical to the elements already presented bear the same references.

This method can notably be used in the step 32 for generating the linear obstacle database to determine the cells with which a linear obstacle must be linked. For each cell 11 present in the obstacle database 1 and for a given linear obstacle, the following steps are carried out:

In a step 70, a check is carried out to see if one of the ends of the linear obstacle, represented by a pointlike obstacle, belongs to the cell, the areas of uncertainty of the ends being included. If it does, in a step 71 the linear obstacle is assigned to the cell by creating a link between the cell 11 and the linear obstacle.

In a step 72, if the ends of the linear obstacle do not belong to the cell, a check is carried out to see if the linear obstacle passes through the cell. Since a linear obstacle is geometrically represented as a segment between two ends, all that is needed is to compute any intersections between the segment and the cell. If the obstacle does pass through the cell, in the step 71 the linear obstacle is assigned to the cell by creating a link between the cell 11 and the linear obstacle.

If the linear obstacle does not pass through the cell, a check is carried out in a step 73 to see if the area of uncertainty of the linear obstacle is at least partly included in the cell. If it is, in the step 71 the linear obstacle is assigned to the cell by creating a link between the cell 11 and the linear obstacle.

Otherwise, no link is created between the cell 11 and the linear obstacle.

This iteration is then repeated for all the linear obstacles. Thus, a linear obstacle can be assigned to several cells. In order to optimize the method, it is best to perform the step 70 before the step 72 in order to optimize the computation time. Similarly, it is best to perform the step 72 before the step 73. However, the sequencing of the steps is given only as an indication.

To return to the example of FIG. 6*a*, by applying the method described in FIG. 6*b*, the linear obstacle 60 is assigned to the cell C1, C2, C3, C5 and C6. The pointlike obstacle 65 is assigned to the cell C1, C2, C4, C5 and C6.

The obstacle database 1 according to the invention can notably be used in a terrain awareness and warning system. A terrain awareness and warning system can thus be complemented by an obstacle collision predicting and alerting system.

The method of generating obstacle databases according to the invention can, for example, be implemented by software.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method of generating a database comprising topographical information on obstacles being distributed over a geographic area, said geographic area being subdivided in the database into several geographic region levels, comprising the following steps:
    (a) reading topographical data obtained from heterogeneous data source;
    (b) generating by a processor topographical data relating to pointlike obstacles from the data collected in the step (a);
    (c) generating by a processor topographical data relating to linear obstacles from the data collected in the step (a);
    (d) creating an obstacle database;
each cell containing a link to the obstacles, each coordinate of said obstacles in the geographic area covered by said cell being recorded with an uncertainty value.

2. The method as claimed in claim 1, further comprising setting the uncertainty value to a default value when the uncertainty value of the coordinates of an obstacle is not known.

3. The method as claimed in claim 1, wherein, when generating the topographical data relating to pointlike obstacles for each cell, a link is created for each pointlike obstacle satisfying one of the following conditions:
    the center of said pointlike obstacle belongs to said cell;
    the area of uncertainty of said obstacle is at least partially contained in said cell.

4. The method as claimed in claim 1, wherein each end of a linear obstacle is represented by a pointlike obstacle.

5. The method as claimed in claim 4, wherein, when generating the topographical data relating to linear obstacles for each cell, a link is created for each linear obstacle satisfying one of the following conditions:
    one of the ends of said linear obstacle at least partially belongs to said cell, the areas of uncertainty of the ends being included;
    one of the segments defined by the ends of said linear obstacle intersects said cell;
    the area of uncertainty of said linear obstacle is contained at least partially in said cell.

6. The method as claimed in claim 1, comprising a step for generating an access tree to the obstacles, the tree comprising:
- a main node of level 0 from which the tree can be browsed,
- nodes pointing to a geographic area, a level of each node corresponding to a level of the geographic area toward which it points;
- each node comprising a link to all lower-level nodes included in the same geographic region and comprising at least one obstacle.

7. The method as claimed in claim 6, wherein each node corresponding to a cell comprises:
- information on the number of pointlike obstacles present in the corresponding cell;
- information on the number of linear obstacles present in the corresponding cell;
- pointers to tables comprising information on the obstacles present in the corresponding cell.

8. The method as claimed in claim 1, comprising a step for generating description tables of the obstacles database, the description tables comprising information relating to the database.

9. A non-transitory computer-readable medium comprising:
- a processor configured to generate topographical information on obstacles, the obstacles being distributed over a geographic area, said geographic area being subdivided into several geographic region levels comprising cells, the topographical information on obstacles comprising:
- at least one Cells table comprising a line for each cell of the geographic area;
- at least one Pointlike obstacles table comprising a line for each pointlike obstacle of the geographic area, said pointlike obstacle table comprising fields for specifying coordinates and height of the pointlike obstacles;
- at least one Linear obstacles table comprising a line for each linear obstacle of the geographic area, said linear obstacle table comprising fields for specifying coordinates and height of the ends of the linear obstacles, each line of the Linear obstacles table comprising links to at least two lines of the Pointlike obstacles table;

each line of the Cells table comprising links to the obstacles present in the corresponding cell.

10. The non-transitory computer-readable medium as claimed in claim 9, comprising a Descriptor table of the obstacle database for storing information identifying the obstacle database loaded on board an aircraft, the date when the obstacle database was produced, and the elements needed to find and access the elements included in the other tables.

11. The non-transitory computer-readable medium as claimed in claim 10, wherein the Descriptor table of the obstacle database comprises the following fields: serial number, production date, pointers to the tables comprising the data on the obstacles.

12. The non-transitory computer-readable medium as claimed in claim 9, comprising tables describing a tree for accessing the information on all the obstacles.

13. The non-transitory computer-readable medium as claimed in claim 9, incorporated in a terrain awareness and warning system comprising an obstacle collision prediction and warning system.

* * * * *